United States Patent [19]  [11] Patent Number: 5,034,738
Ishihara et al.  [45] Date of Patent: Jul. 23, 1991

[54] CONCENTRATOR FOR LOCAL AREA NETWORK WITH LOOP TOPOLOGY

[75] Inventors: Hiroshi Ishihara; Toshiyuki Nishikawa, both of Hyogo, Japan

[73] Assignee: Mitsubishi Cable, Hyogo, Japan

[21] Appl. No.: 451,158

[22] Filed: Dec. 15, 1989

[30] Foreign Application Priority Data

Dec. 21, 1988 [JP] Japan .................. 63-324012

[51] Int. Cl.⁵ ........................................ H04B 3/00
[52] U.S. Cl. .................. 340/825.05; 370/56; 370/85.15
[58] Field of Search ............... 340/825.05, 825.06, 340/825.07, 825.2, 825.5, 825.52; 370/56, 85.12, 85.15, 85.12; 307/112, 115, 96, 98; 320/1; 361/271, 275, 280, 281, 286

[56] References Cited

U.S. PATENT DOCUMENTS

| 4,078,228 | 3/1978 | Miyazaki | 370/85.15 |
| 4,417,242 | 11/1983 | Bapst et al. | 340/825.05 |
| 4,584,518 | 4/1986 | Higashino et al. | 320/1 |
| 4,701,630 | 10/1987 | Annunziata et al. | 307/112 |
| 4,733,153 | 3/1988 | Katzenstein | 320/1 |
| 4,800,532 | 1/1989 | Honeck et al. | 320/1 |
| 4,847,611 | 7/1989 | Bekki et al. | 340/825.05 |
| 4,862,158 | 8/1989 | Keller et al. | 340/825.05 |

FOREIGN PATENT DOCUMENTS

| 61-208334 | 9/1986 | Japan | 370/56 |
| 64-8748 | 1/1989 | Japan | 370/56 |
| 2097224 | 10/1982 | United Kingdom | 370/56 |

Primary Examiner—Sandra L. O'Shea
Assistant Examiner—Dervis Magistre

[57] ABSTRACT

A concentrator for a local area network with loop topology uses a connector to which a first workstation is connected and a relay contact for switching between a state in which second and third workstations positioned at both sides of the first workstation are connected to each other and another state in which the first workstation is connected via the connector between the second and the third workstations. The concentrator includes an activation member for activating the relay contact and a pair of condensers to be charged by direct current from the first workstation when the first workstation is connected. The activation member is operated by discharging the direct current. A controller controls the discharging of one of the pair of condensers by detecting the changes in connection conditions of the first workstation.

4 Claims, 2 Drawing Sheets

CONCENTRATOR FOR LOCAL AREA NETWORK WITH LOOP TOPOLOGY

BACKGROUND OF THE INVENTION

The present invention relates to a concentrator for a local area network (LAN) system with loop topology.

FIG. 2 shows a local area network with loop topology using the conventional concentrators as disclosed in, for example, U.S. Pat. No. 4,701,630, "LOCAL AREA NETWORK STATION CONNECTOR" granted to Annunziata et al., issued on Oct. 20, 1987.

In FIG. 2, there are provided three concentrators $N_1-N_3$ with the same construction. Workstations, in this example, seven, $WS_1-WS_7$ as terminals are connected to each of the concentrators $N_1-N_3$. Each of the workstations $WS_1-WS_7$ is electrically coupled to a line L via a relay circuit R. To transmit data from one of the workstations, say, $WS_2$ to another the workstation, say, $WS_4$, an address code $A_4$ peculiar to the receiving workstation $WS_4$ is affixed to the data transmitted from the transmitting workstation $WS_2$. The transmitted data once received by the adjacent workstation $WS_3$ the address code $A_4$ is then checked. When it is determined that the address code $A_4$ does not agree its own peculiar address code, the transmitted data is transferred to the next workstation $WS_4$. When the transmitted data is received by the workstation $WS_4$, the destination address code $A_4$ is determined to agree to its own peculiar address code $A_4$, so that the workstation $WS_4$ finally receives the transmission data to process data according to the input data.

In order to add a new workstation $WS_8$ to the above-described network, the new workstation $WS_8$ is connected to the relevant concentrator $N_2$. A controller (not shown) incorporated in the concentrator $N_2$ sets the relay circuit R to couple the new workstation $WS_8$ to the line L. In order to remove one of the workstations, say, $WS_2$ from the network, the workstation $WS_2$ is separated from the concentrator $N_2$. Then, the controller incorporated in the concentrator $N_2$ resets the relay circuit R so that adjacent workstations $WS_1$ and $WS_3$ are directly coupled via the line L.

In the conventional concentrators $N_1-N_3$, an AC power source AC is provided for activating the relay circuit R. The AC power source is connected to each of the concentrators $N_1-N_3$ via a respective one of cables $C_1-C_3$. The AC power source AC enables the switching operations to become rapid and certain, advantageously. However, a cable $C_1-C_3$ is required for each of the concentrators $N_1-N_3$. In particular, when the size of the network is large and a great number of concentrators are needed, a great number of cables are required. Therefore, the work for the wiring of the great number of cables takes a lot of time.

SUMMARY OF THE INVENTION

With the foregoing in mind, it is an object of the present invention to provide an improved concentrator for a local area network with loop topology without any necessity of an AC power source for driving a relay circuit so as to eliminate task for wiring of AC power cable.

It is another object of the present invention to provide an improved concentrator for a local area network with loop topology for stably conducting the set and the reset operations of a relay circuit.

Briefly described, in accordance with the present invention, a concentrator for a local area network with loop topology comprises connector means to which a first workstation is connected; relay contact means for switching between a state in which second and third work stations positioned at both sides of the first workstation are connected to each other, and another state in which the first workstation is connected via the connector means between the second and the third workstations; activation means for activating the relay contact means; condenser means for charging a direct current from the first workstation, and operating the activation means by discharging the direct current; and control means for controlling the discharging of the condenser means by detecting the changes in connection conditions of the first workstation.

According to the present invention, when the first workstation is connected between the second and the third workstations, the direct current from the first workstation charges the condenser means. In addition, when the first workstation is connected and/or separated, the control means causes the condenser means to discharge such that the activation means is operated to activate the relay contact means to one state in which the first workstation is coupled or to the other state in which the second and the third workstations are connected to each other.

Therefore, according to the present invention, the activation means for switching the relay contact means is operated by the discharging of the condenser means charged by the direct current from the workstation connected. This operation can eliminate the conventional cables $C_1-C_3$ and simplify the arrangement work. The total system can become compact.

In a specific form of the present invention, the activation means comprises a first activation means for switching the relay contact means to the one side in which the first workstation is connected, and a second activation means for switching the relay contact means to the other side in which the second and the third workstations are connected to each other. In addition, the condenser means comprises a first condenser means related to the first activation means and a second condenser means related to the second activaiton means.

With the specific form of the present invention, the first condenser means is independent on the second condenser means and the charging of the first and the second condenser means is therefore independent on each other. The first and the second condenser means are fully charged in a short time. The operations of the first and the second condenser means can be stabilized to ensure the switching of the relay contact means. Thus, the setting and the resetting operations of the relay circuit can be stably performed.

BRIEF DESCRIPTION OF THE DRAWINGS

The present invention will become more fully understood from the detailed description given below and the accompanying drawings which are given by way of illustration only, and thus are not limitative of the present invention and wherein.

DESCRIPTION OF THE PREFERRED EMBODIMENT

Figure 1:
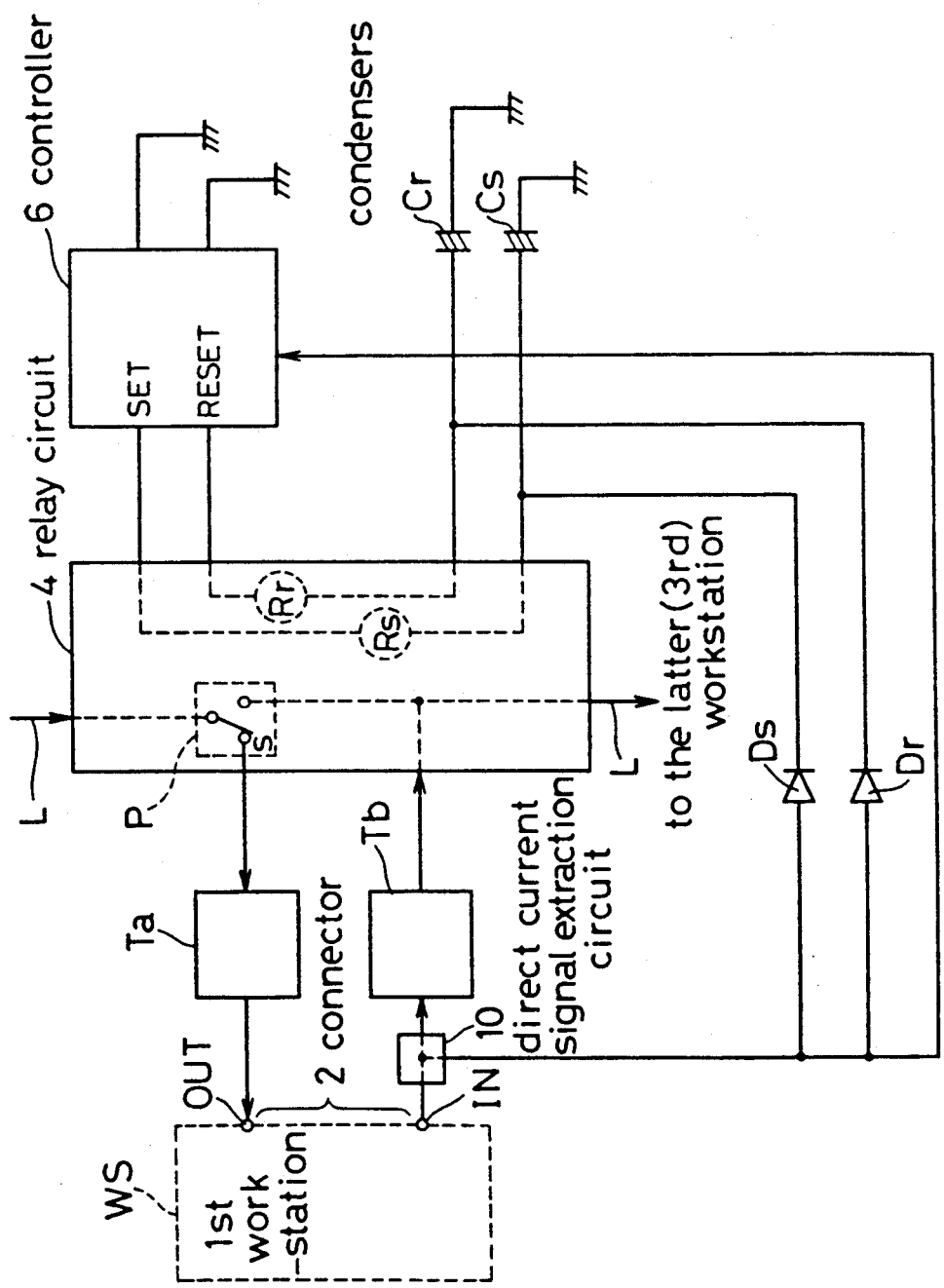
FIG. 1 is a circuit diagram of a concentrator for a local area network with loop topology according to a preferred embodiment of the present invention.
Figure 2:
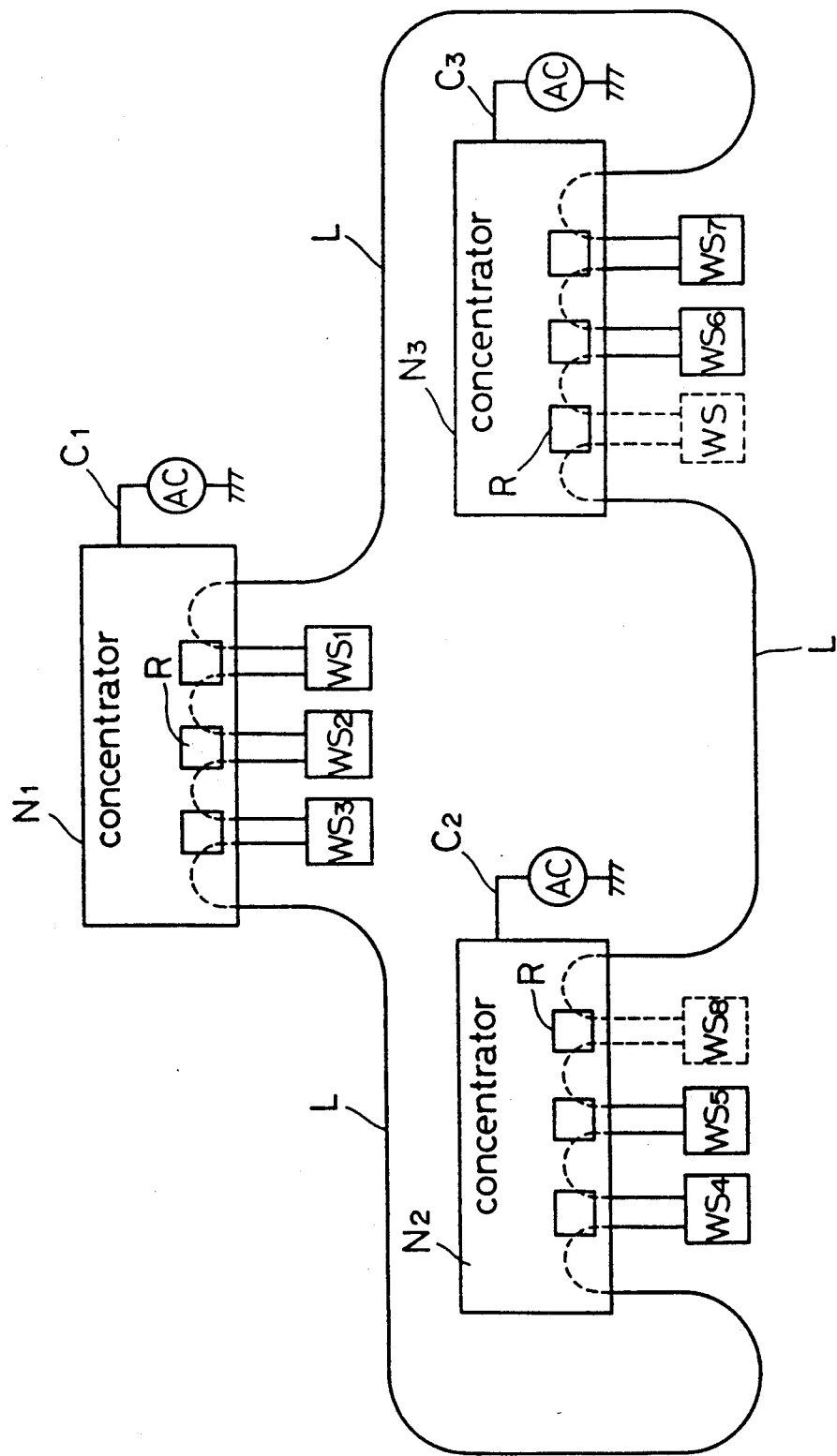
FIG. 2 is a diagram of a local area network with loop topology using the conventional concentrator.

FIG. 1 is a circuit diagram of a concentrator, to which a single workstation is connected, for a local area network with loop topology according to a preferred embodiment of the present invention.

In FIG. 1, there are provided a concentrator 1 and a connector [connector means] 2 to which a single workstation WS is connected. The connector 2 has an input terminal IN and an output terminal OUT connected to the workstation WS. A latch-type relay circuit 4 is provided corresponding to the connector 2. The relay circuit 4 comprises a contact P [relay contact means] for switching to the line side and the connector side, a set coil Rs [first activation means] for setting the contact P, and a reset coil Rr [second activation means] for resetting the contact P. A setting purpose condenser Cs [first condenser means] is connected to the set coil Rs to be charge by direct current from the workstation WS. A resetting-purpose condenser Cr [second condenser means] is connected to the reset coil Rr to be charged by the direct current from the workstation WS. A controller 6 [control means] is provided for generating a set/reset signal to the relay circuit 4 in response to the presence and the absence of the connection of the workstation WS to the connector 2. The controller 6 has a CR time constant circuit controlling a suitable time for sufficiently charging the condensers Cs and Cr. Further, two pulse transformers Ta and Tb and diodes Ds and Dr for preventing a reverse current are provided. A direct current signal extraction circuit 10 is provided for extracting only the component of a DC signal only from a composite signal of both the DC signal and the AC signal supplied from the workstation WS for data transmission.

According to the connection and separation of the workstation WS in the above-described concentrator 1, the control operations are carried out as follows. The contact P is reset before the workstation WS is connected to the connector 2. Therefore, in the center of the relay circuit 4, the former-stage workstations and the latter-stage workstations (neither shown) are directly coupled via the line L. In such a case, when the workstation WS is now connected to the connector 2 of the concentrator 1, the composite signal supplied from the workstation WS is applied to the input terminal IN. The output signal from the workstation is the composite signal composing of a DC signal as an offset and an AC data signal. The DC signal component is extracted by the direct current signal extraction circuit 10 and supplied to the condensers Cs and Cr via the diodes Ds and Dr to charge the condensers Cs and Cr. The DC signald component is applied also to the controller 6. Responsive to the input of the DC signal component, the controller 6 generates a low-level set signal to the relay circuit 4 after the time determined by the CR time constant circuit. The charges stored in the setting-purpose condenser Cs are discharged in response to the low-level set signal through the set coil Rs and the controller 6, so that the contact P is set. Therefore, the workstation WS is connected to the line L. Here, the transmission data signals sent from the former-stage workstations are received by the workstation WS via the transformer Ta and the output terminal OUT from the contact P. The data signals transmitted from the workstation WS are forwarded to the next workstation via the input terminal IN of the connector 2, the transformer Tb, and the line L.

On the other hand, when thw workstation WS is removed from the connector 2, the supply of the DC signal fromd the workstation WS is stopped. Responsive to this stop, the controller 6 outputs a low-level reset signal to the relay circuit 4. According to the reset signal, the charges stored in the resetting condenser Cr are discharged via the reset coil Rr and the controller 6 to thereby reset the contact P. Therefore, the workstation WS is separated from the line L.

To compose a local area network using the above-described concentractor 1, first the workstation WS is connected to the connector 2, in order to confirm the operation of the relay circuit 4, to set the relay circuit 4. Immediately after this, the workstation WS may be removed from the connector 2. Even if such a case, the charges stored in the reset condenser Cr cause the relay circuit 4 to be reset, so that the relay circuit 4 is presented from being kept in a set condition. The relay circuit 4 can always operate for its set or reset condition.

While only certain embodiments of the present invention have been described, it will be apparent to those skilled in the art that various changes and modifications may be made therein without departing from the spirit and scope of the present invention as claimed.

What is claimed is:

1. A concentrator for a local area network with loop topology comprising:

a connector to which a first workstation is connected:

relay contact means for switching between a state in which second and third workstations positioned at both sides of the first workstation are connected to each other and another state in which the first workstation is connected via said connector between the second and third workstations;

activation means for activating said relay contact means;

said activation means including, first activating means for switching said relay contact means to said state in which the first workstation is connected between the second and third workstations, and second activating means for switching said relay contact means to said state in which the second and third workstations are directly connected to each other;

condenser means for being charged by a direct current from the first workstation and for operating said activation means by discharging the direct current;

said condenser means including, a first condenser connected to said first activating means, and a second condenser connected to said second activating means; and control means for controlling the discharging of said condenser means according to changes in connection conditions of the first workstation.

2. A concentrator for a local area network having a plurality of workstations with loop topology, comprising:

switch means for selecting either a first operational state in which workstations positioned on either side of a center workstation are connected directly to each other or a second operational state in which the workstations positioned adjacent to the center workstation are connected to the center workstation such that the center workstation is connected in series between the two adjacent workstations;

condenser means, operatively connected to said switch means, for receiving a charge from a direct current produced by the center workstation and for activating said switch means upon discharging said charge; and control means, operatively connected to said condenser means, for controlling the discharging of said condenser means according to connection conditions for the center workstation.

3. The concentrator as claimed in claim 2 wherein said condenser means includes at least two capacitors for charging and discharging.

4. The concentrator as claimed in claim 2 wherein said switch means is a latch-type relay circuit.

* * * * *